United States Patent [19]
Takaishi et al.

[11] 3,894,099
[45] July 8, 1975

[54] PROCESS FOR PREPARING 1-METHYLDAMANTANE

[75] Inventors: Naotake Takaishi; Yoshiaki Inamoto, both of Wakayama; Kiyoshi Tsuchihashi, Kainan, all of Japan

[73] Assignee: Kao Soap Co., Ltd., Tokyo, Japan

[22] Filed: Oct. 9, 1973

[21] Appl. No.: 404,195

[30] Foreign Application Priority Data
Oct. 24, 1972 Japan............................ 47-106514

[52] U.S. Cl....................... 260/666 M; 260/666 PY
[51] Int. Cl............................................. C07c 13/32
[58] Field of Search................ 260/666 M, 666 PY

[56] References Cited
UNITED STATES PATENTS
3,356,751  12/1967  Schneider...................... 260/666 M

*Primary Examiner*—Veronica O'Keefe
*Attorney, Agent, or Firm*—Woodham, Blanchard and Flynn

[57] ABSTRACT

A process is disclosed of isomerizing tricyclo [$5.2.2.0^{2,6}$] undecane (I) to form 1-methyladamantane (II), a compound of known usefulness, in high yield under mild reaction conditions using an aluminum halide catalyst in a halogenated lower hydrocarbon solvent.

2 Claims, No Drawings

PROCESS FOR PREPARING 1-METHYLADAMANTANE

BACKGROUND OF THE INVENTION

1. Field of the Invention

This invention relates to a process for isomerizing tricyclo-[5.2.2.0$^{2,6}$] undecane (I) to 1-methyladamantane (II).

2. Description of the Prior Art

A. Schneider et al in U.S. Pat. No. 3,356,751 have disclosed an isomerization process of tricyclic naphthenes designed to favor the production of multiple isomeric forms of methyl-substituted adamantane using large amounts of an $AlCl_3$—HCl, $AlBr_3$—HBr, or HF—$BF_3$ catalyst and stopping the reaction at an intermediate isomerization stage. Applied to tricyclo [5.2.2.0$^{2,6}$] undecane (I) the patented process would produce principally 2-methyladamantane, i.e., where non-bridgehead methyl-substituted adamantane is the main isomerization product.

The results of the prior patented process are effected through the use of the above-named complex catalysts, the non-bridgehead methyl-substitution product being of use as starting materials in making intensively mixed ester products useful as lubricants having low pour points.

The reaction conditions of the patented process are necessarily selected so that the isomerization will proceed at an interruptable rate, so that the main product can be non-bridgehead methyladamantanes. The progress of this prior reaction given in the patent shows that the catalyst complexes produce a highly complex mixture containing large proportions of unidentified isomers with the non-bridgehead product predominating after many hours.

BRIEF STATEMENT OF THE DISCLOSURE

According to the invention, I, a novel and useful tricyclic hydrocarbon can be synthesized by the hydrogenation (preferably catalytic) of tricyclo [5.2.2.0$^{2,6}$] undeca-3,8-diene which in turn is obtained by Diels-Alder reaction of 1,3-cyclohexadiene and dicyclopentadiene (N. Cameli, G. Salvetti, and G. Sartorp, Italian Pat. No. 730,703 (1966); C.A.,69, 51740 y (1968.), and which can be isomerized into 1-methyladamantane in substantially a quantitative yield under mild reaction conditions.

Further, according to this invention I is caused to isomerize to II in substantially quantitative yield, i.e., above 90 percent, under mild reaction conditions in the presence of an aluminum halide (aluminum chloride or aluminum bromide) as catalyst in a halogenated lower hydrocarbon solvent as reaction medium.

The reaction can be shown as follows

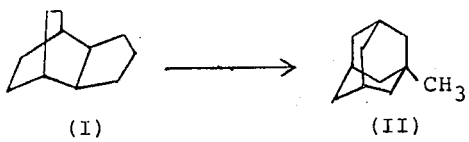

The catalyst used in the isomerization process of this invention is an uncomplexed anhydrous aluminum halide. The present process does not require the use of a complex catalyst such as, for example aluminum halide-hydrogen halide, an aluminum halide-hydrogen halide-alkylhalide, or aluminum halide-hydrogen halide-lower tertiary alkyl-containing hydrocarbon (a so-called sludge catalyst).

The amount of aluminum halide (aluminum chloride or aluminum bromide) used in the process of this invention is in the range of 0.01 to 0.5 mole, preferably in the range of 0.05 to 0.1 mole per mole of the starting I.

The halogenated lower hydrocarbon solvent is preferably a chlorinated or brominated hydrocarbon containing 1 to 6 carbon atoms such as methylene chloride, methylene bromide, chloroform, 1,2-dichloroethane, 1,2-dibromoethane, 1,2-dichloropropane, 1,3-dichloropropane, 1,4-dichlorobutane, 2-methyl-1,4-dichlorobutane and chlorocyclohexane. The amount of solvent employed is from 2 to 20 times the weight of starting material (I).

The isomerization reaction of this invention can be carried out over a wide range of temperature, i.e., in the range of −10°C to +120°C. The reaction is preferably carried out in the range of from 20°C to 60°C.

According to the process of this invention 1-methyladamantane of high purity can be obtained in substantially a quantitative yield without the production of by-products of either fragmented or tarry nature.

The reaction time is selected so that the starting material (I) is substantially completely transformed to (II). It is preferred to employ a reaction time in the range of 1 to 20 hours.

The process of the present invention will be further described by reference to the following illustrative examples. A synthesis of tricyclo [5.2.2.0$^{2,6}$] undecane (I) used as the starting material of the process of this invention will be also described in the preparation examples.

PREPARATION EXAMPLE 1

Tricyclo [5.2.2.0$^{2,6}$] undeca-3,8-diene was synthesized according to the process of N. Cameli, et al. (specification of Italian Pat. No. 730,703).

Under nitrogen atmosphere, 30 g of 1.3-cyclohexadiene, 74.3 g of dicyclopentadiene and 50 mg of hydroquinone were charged in a 500 ml autoclave and the reaction was carried out at a reaction temperature of 200°C for 8 hours. The reaction mixture was allowed to cool and subjected to fractional distillation. Fractions of b.p. 58° – 60°C (3mm Hg) were collected to obtain 37 g of tricyclo [5.2.2.0$^{2,6}$]undeca-3,8-diene (Yield 67%).

Elementary analysis:
  Found; C 89.8%, H 9.5%
  Theoretical (as $C_{11}H_{14}$); C 90.35%, H 9.65%

PREPARATION EXAMPLE 2

In a 500 ml autoclave, 31 g of tricyclo [5.2.2.0$^{2,6}$] undeca-3,8-diene, 100 ml of diethyl ether and 1.5 g of Raney nickel catalyst were charged. Hydrogen was introduced therein under pressure (initial pressure 20 kg/cm$^2$), and the mixture was stirred at a reaction temperature of about 100°C for 4.5 hours. After cooling, the reaction mixture was filtered to remove the catalyst. The filtrate was fractionally distilled to obtain 29g (Yield 90%) of tricyclo [5.2.2.0$^{2,6}$] undecane. Boiling point: 72° – 74°C (5 mm Hg)
  $n_D^{28}$ : 1.5010

Elementary analysis:
 Found; C 87.9% H 12.0%
 Theoretical (as $C_{11}H_{18}$); C 87.92%, H 12.08%
nmr. (CCl4 solvent):
 τ 7.9 – 9.0   Complex multiplet
ir. ($cm^{-1}$):
 2920, 2855, 1480, 1470, 1458
mass (m/l):
 150(100), 122(95), 121(51), 80(77), 67(72)

The above data indicate that the product is tricyclo [5.2.2.0$^{2,6}$] undecane (I).

EXAMPLE

A solution of 15g (0.1 mole) of tricyclo [5.2.2.0$^{2,6}$] undecane (I) obtained in Preparation Example 2 in 100 ml of methylene chloride was stirred at a temperature of 0°C. 1.3 Grams (0.01 mole) of anhydrous aluminum chloride were added thereto and the mixture was refluxed with stirring for three hours. The reaction mixture was allowed to cool and poured into 100 ml of ice-water. The organic layer was separated out and the aqueous layer was subjected to an extraction with methylene chloride. The methylene chloride solution was combined with the organic layer, washed with saturated aqueous sodium hydrogencarbonate and water successively and dried with anhydrous sodium sulfate. Methylene chloride was removed and the thus obtained residue was purified by sublimation to obtain 13.8g (yield 92%) of 1-methyladamantane. The ir, the nmr and the mass spectra of the product coincided with those of an authentic sample of 1-methyladamantane.

The embodiments of the invention in which an exclusive property or privilege is claimed are defined as follows:

1. The process for preparing 1-methyladamantane, which comprises contacting (I) tricyclo[5.2.2.0$^{2,6}$] undecane dissolved in from 2 to 20 times by weight, based on the weight of I, of a solvent selected from the group consisting of methylene chloride, methylene bromide, chloroform, 1,2-dichloroethane, 1,2-dibromethane, 1,2-dichloropropane, 1,3-dichloropropane, 1,4-dichlorobutane, 2-methyl-1,4-dichlorobutane and chlorocyclohexane, with a catalyst selected from the group consisting of uncomplexed anhydrous aluminum chloride and uncomplexed anhydrous aluminum bromide, at a molar ratio of from 0.01 to 0.5 mole of said catalyst per one mole of I, at a temperature of −10° to +120°C, for a reaction time in the range of 1 to 20 hours until I is substantially completely transformed to 1-methyladamantane, and recovering 1-methyladamantane from the reaction mixture.

2. The process of claim 1, in which the amount of catalyst is from 0.05 to 0.1 mole, per mole of I, and the temperature is from 20° to 60°C.

* * * * *